(12) United States Patent
Joly et al.

(10) Patent No.: US 7,091,501 B2
(45) Date of Patent: *Aug. 15, 2006

(54) BINDERLESS STORAGE PHOSPHOR SCREEN ON A DEDICATED SUPPORT

(75) Inventors: Ludo Joly, Hove (BE); Rudi Van den Bergh, Lint (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 302 days.

This patent is subject to a terminal disclaimer.

(21) Appl. No.: 10/369,401

(22) Filed: Feb. 19, 2003

(65) Prior Publication Data

US 2003/0168611 A1 Sep. 11, 2003

Related U.S. Application Data

(60) Provisional application No. 60/367,886, filed on Mar. 27, 2002.

(30) Foreign Application Priority Data

Mar. 8, 2002 (EP) .................................. 02100235

(51) Int. Cl.
| | |
|---|---|
| H05B 33/00 | (2006.01) |
| G03B 42/02 | (2006.01) |
| G21K 4/00 | (2006.01) |
| A61B 6/00 | (2006.01) |
| G01N 23/04 | (2006.01) |
| B23B 3/26 | (2006.01) |

(52) U.S. Cl. .................. 250/484.4; 250/582; 428/304.4
(58) Field of Classification Search ............ 250/361 R, 250/483.1, 484.4, 486.1, 582, 581; 976/DIG. 439; 428/306.6
See application file for complete search history.

(56) References Cited

U.S. PATENT DOCUMENTS 4,769,549 A * 9/1988 Tsuchino et al. ........ 250/484.4

(Continued)

FOREIGN PATENT DOCUMENTS

| EP | 0 288 038 | 10/1988 |
|---|---|---|
| EP | 1 113 458 | 7/2001 |
| EP | 1 316 969 | 6/2003 |

OTHER PUBLICATIONS

European Search Report, Application No. 02 10 0235, Jul. 29, 2002.
Database WPI, Section Ch, Week 198726, Derwent Publications, Ltd., XP002207766, May 21, 1987.

(Continued)

*Primary Examiner*—David Porta
*Assistant Examiner*—Frederick F. Rosenberger
(74) *Attorney, Agent, or Firm*—Joseph T. Guy; Nexsen Pruet, LLC (57) ABSTRACT

A binderless stimulable phosphor screen comprises a vapor deposited storage phosphor layer on a support and a protective layer wherein the vapor deposited phosphor is needle-shaped with voids between the needles, wherein the voids are partially filled with a polymeric compound.

21 Claims, 7 Drawing Sheets

U.S. PATENT DOCUMENTS

| | | |
|---|---|---|
| 4,947,046 A | 8/1990 | Kawabata et al. ........ 250/484.1 |
| 4,963,751 A | 10/1990 | Kano et al. .............. 250/484.1 |
| 5,171,996 A | 12/1992 | Perez-Mendez ......... 250/361 R |
| 5,338,926 A * | 8/1994 | Yoshida ................ 250/214 VT |
| 6,031,236 A * | 2/2000 | Arakawa et al. ......... 250/484.4 |
| 6,246,063 B1 * | 6/2001 | Fukui ....................... 250/484.4 |
| 6,641,858 B1 * | 11/2003 | Suzuki et al. ................. 427/64 |
| 6,800,362 B1 * | 10/2004 | Van den Bergh et al. ....................... 428/304.4 |
| 2004/0041099 A1 * | 3/2004 | Gebele et al. ........... 250/484.4 |

OTHER PUBLICATIONS

Patent Abstracts of Japan, vol. 013, No. 096(P-839), Mar. 7, 1989 & JP 63 278000, Nov. 15, 1988

Paent Abstracts of Japan, vol. 016, No. 460(P-1427), Sep. 24, 1992 & JP 04 164299 Jun. 9, 1992.

Database WPI, Section Ch, Week 200041, Derwent Publications, Ltd., XP002207767, Jul. 31, 2000.

* cited by examiner

BINDERLESS STORAGE PHOSPHOR SCREEN ON A DEDICATED SUPPORT

The application claims the benefit of U.S. provisional application No. 60/367,886 filed Mar. 27, 2002

FIELD OF THE INVENTION

The present invention relates to a binderless storage phosphor screen with vapor deposited phosphors.

BACKGROUND OF THE INVENTION

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which (are) be processed to produce a visible image. For this purpose, the phosphor should store as much as possible of the incident X-ray energy and emit as little as possible of the stored energy until stimulated by the scanning beam. This is called "digital radiography" or "computed radiography".

Since in the above described X-ray recording systems the X-ray conversion screens are used repeatedly, it is important to provide them with an adequate topcoat for protecting the phosphor containing layer from mechanical and chemical damage. This is particularly important for photostimulable radiographic screens where screens are often transported in a scanning module—wherein the stimulation of the stored energy takes place—while not being encased in a cassette but is used and handled as such without protective encasing.

The image quality that is produced by any radiographic system using phosphor screen thus also in a digital radiographic system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by physical vapor deposition, which may be thermal vapor deposition, sputtering, electron beam deposition or other of phosphor material on a substrate. However, this production method can not be used to produce high quality screens with every arbitrary phosphor available. The mentioned production method leads to the best results when phosphor crystals with high crystal symmetry and simple chemical composition are used.

The use of alkali metal halide phosphors in storage screens or panels is well known in the art of storage phosphor radiology and the high crystal symmetry of these phosphors makes it possible to provide structured,as well as binderless screens.

It has been disclosed that when binderless screens with an alkali halide phosphor are produced it is beneficial to have the phosphor crystal deposited as some kind of piles, needles, tiles, etc. to increase the image quality than can be obtained when using such a screen. In, e.g., U.S. Pat. No. 4,769,549 it is disclosed that the image quality of a binderless phosphor screen can be improved when the phosphor layer has a block structure shaped in fine pillars. In e.g. U.S. Pat. No. 5,055,681 a storage phosphor screen comprising an alkali halide phosphor in a pile-like structure is disclosed. Also in EP-A-1 113 458 a phosphor panel with a vapor deposited CsBr:Eu phosphor layer wherein the phosphor is present as fine needles separated by voids is disclosed for optimising the image quality.

Unfortunately such needle shaped phosphors are quite brittle and the phosphor panels are prone to physical damage after only a few cycles in the scanning apparatus. It has been proposed to strengthen the screens or panels by applying a protective layer on top of the vapor deposited phosphor layer. Such a protective overcoat is described in published EP-A-392 474. Also the use of radiation curable coating to form a protective top layer in a X-ray conversion screen is described e.g. in EP-A-209 358 and JP-A-86 176 900 and U.S. Pat. No. 4,893,021. For example, the protective layer comprises a UV cured resin composition formed by monomers and/or prepolymers that are polymerized by free-radical polymerisation with the aid of a photoinitiator. The monomeric products are preferably solvents for the prepolymers used.

In co-pending EP-Application No. 01000694, filed Dec. 3, 2001, a binderless stimulable phosphor screen is disclosed having a support and a vapor deposited phosphor layer and a protective layer on top of said phosphor layer characterized in that said vapor deposited phosphor is needle-shaped and said phosphor needles have a length, L and voids between them and wherein said protective layer fills said void for at most 0.10 times L. By doing so the strength of the panel is increased. In U.S. Pat. No. 4,947,046 it is disclosed that the voids between needle phosphor can be filled with colorants, dyes and/or pigments, thus enhancing the image quality.

Although all screens disclosed in this prior art can yield X-ray images with good quality, there is still a need for storage phosphor screens with increased physical strength that can withstand the wear and the tear of transporting.

OBJECTS AND SUMMARY OF THE INVENTION

It is an object of the invention to provide a binderless stimulable phosphor screen useful in an X-ray recording system with a strong protective layer and that can be transported easily through a scanning module without causing jamming.

The above mentioned object is realized by providing a stimulable phosphor screen having the specific features defined in claim 1. Specific features for preferred embodiments of the invention are disclosed in the dependent claims.

Further advantages and embodiments of the present invention will become apparent from the following description.

DETAILED DESCRIPTION OF THE INVENTION

By "vapor deposited phosphor" it is, throughout this text, meant a phosphor that is deposited on a substrate by any method selected from the group consisting of thermal vapor deposition, chemical vapor deposition, electron beam deposition, radio frequency deposition and pulsed laser deposition. This vapor deposition is preferably carried out under conditions as described in EP-A-1 113 458.

When vapor deposited phosphor layers contain phosphor needles separated by voids as disclosed in, e.g., the above mentioned EP-A-1 113 458, the phosphor layer is, as said above, quite sensitive with regard to mechanical impact. It was found now that the voids between the needles could easily be filled with a polymer and that when the voids were partially filled with a polymeric compound, the mechanical strength of the phosphor layer is greatly enhanced and a phosphor screen with the good sharpness associated with the needle shape of the phosphor and the good mechanical properties associated with phosphor layers containing phosphor particles in a binder are both realized in the same panel. Preferably, the voids are filled over a length of at least 5 μm. More preferably, the voids are filled over a length of at least 10 μm. Most preferably, the voids are filled over a length of 15 μm.

Polymers used in order to fill the voids can be any polymer or polymer mixture known as a binder in the art of making phosphor panels. Useful polymers for use in a phosphor panel of the present invention are preferably selected from the group consisting of vinyl resins, polyesters and polyurethane resins. A first preferred class of polymers to be used as binders are the vinyl resins. According to the Whittington's dictionary of plastics this class includes all resins and polymers made from monomers containing the vinyl group $CH_2=CH—$. Examples of such ethylenic monomers include acrylates, methacrylates, vinyl esters, olefins, styrenes, crotonic acid esters, itaconic acid diesters, maleic acid diesters, fumaric acid diesters, acrylamides, acryl compounds, vinyl ethers, vinyl ketones, vinyl heterocyclic compounds, glycidyl esters, unsaturated nitriles, polyfunctional monomers, and various unsaturated acids. A further class of useful polymers are polyesters with $Tg \leqq 0$. This class comprises all polymers in which the main polymer backbones are formed by the esterification condensation of polyfunctional alcohols and acids. Also hydrogenated styrene-diene block copolymers, having a saturated rubber block, as rubbery and/or elastomeric polymers can be for filling the voids in a binderless phosphor panel of this invention. The elastomeric polymer can be represented by the formula A-B-A (tri-block) or by the formula A-B (di-block), wherein A represents styrene and B represents the hydrogenated diene block e.g. ethylene-butylene or ethylene-propylene. Also polyurethane resins can be used as polymer in phosphor panels of this invention.

The polymers can be dissolved in any suitable solvent, e.g., lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents.

According to the present invention a stimulable phosphor screen is thus provided wherein voids between said needles are partially filled with a polymeric compound selected from the group consisting of vinyl resins comprising moieties derived from esters of acrylic acid and vinyl resins comprising moieties derived from esters of methacrylic acid.

When the phosphor screen comprises a vapor deposited CsBr:Eu needle phosphor it is preferred to use polymers that do not carry hydrophilic substituents, e.g., polymers without free hydroxyl, carboxyl or sulfonic acid groups. When polyester are used it is preferred to use polyester with an acid number lower than 5 mol/g and with a hydroxyl number lower than 5 mol/g. The polymers for use in phosphor screen with a vapor deposited CsBr:Eu needle phosphor are preferably dissolved in a solvent that can easily be kept "water free". By "water free" is understood a solvent that has less than 10% wt/wt of water. Thus a solution of vinyl resins, more specifically vinyl resins comprising moieties derived from (meth)acrylic acid, and/or esters of (meth)acrylic acid in ethylacetate is a first preferred solution to bring a polymer in the voids between the needle shaped phosphor in a vapor deposited phosphor panel of this invention.

A further preferred solution to bring a polymer in the voids between the needle shaped phosphor in a vapor deposited phosphor panel of this invention is a solution of a thermoplastic rubber, this rubber is preferably a block-copolymeric KRATON-G rubbers, KRATON being a trade mark name from SHELL. KRATON-G thermoplastic rubber polymers are a unique class of rubbers designed for use without vulcanisation in a mixture of ethyl acetate and toluene. According to the present invention a stimulable phosphor screen is provided wherein voids between said needles are partially filled with a polymeric compound, being a thermoplastic rubber.

It is also possible to bring a polymer in the voids between the needle phosphors in a vapor deposited phosphor screen of this invention by applying a protective layer on top of the phosphor layer from a solution that has a viscosity so that the coating solution of the protective layer seeps into the voids between the phosphor needles. This means that in one production step the (partial) filling of the voids and the production of the protective layer proceed simultaneously. When it is desired to apply a radiation curable protective layer, then it is preferred that the viscosity of the coating solution is adapted so that, with phosphor needles having a length, L, said protective layer fills said void for at most 0.10 times L. When the voids are filled deeper with a radiation curable protective layer, then the ease of recuperation of the phosphor is compromised. It was found that by adjusting the viscosity of the protective layer so that, with phosphor needles having a length, L, said protective layer fills said void for at most 0.10 times L, a very acceptable compromize between the strength of the surface and the ease of recuperation of the phosphor could be achieved.

Although the image quality that can be obtained in computed radiography when using a stimulable phosphor panel of this invention having needle-shaped phosphor is very high, it has been found that the image quality could be enhanced when the voids between the phosphor needles further contained a colorant (dye and/or pigment) that absorbs light of the stimulating wavelength. A further improvement was realized when the voids contained a colorant absorbing the stimulating radiation together with a colorant reflecting the light emitted by the stimulable phosphor upon stimulation. When an alkali metal phosphor is used in the panel according to this invention, then the stimulating light is either red or infrared light and then the colorant is preferably a blue colorant. As the colorant, either an organic colorant or an inorganic colorant can be employed. For example, the organic colorant having a body color ranging from blue to green which can be employed in the radiation image storage panel of the present invention includes ZAPON FAST BLUE 3G (manufactured by Hoechst AG.), ESTROL BRILL BLUE N-3RL (manufactured by Sumitomo Kagaku Co., Ltd.), SUMIACRYL BLUE F-GSL (manufactured by Sumitomo Kagaku Co., Ltd.), D & C BLUE No. 1 (manufactured by National Aniline Co., Ltd.), SPIRIT BLUE (manufactured by Hodogaya Kagaku Co., Ltd.), OIL BLUE No. 603 (manufactured by Orient Co., Ltd.), KITON BLUE A (manufactured by Ciba Geigy AG.), AIZEN CATHILON BLUE GLH (manufactured by Hodogaya Kagaku Co., Ltd.), LAKE BLUE A.F.H. (manufactured by Kyowa Sangyo Co., Ltd.), RODALIN BLUE 6GX (manufactured by Kyowa Sangyo Co., Ltd.), PRIMOCYANINE 6GX (manufactured by Inahata Sangyo Co., Ltd.), BRILLACID GREEN 6BH (manufactured by Hodogaya Kagaku Co., Ltd.), CYANINE BLUE BNRS (manufactured by Toyo Ink Co., Ltd.), LIONOL BLUE SL (manufactured by Toyo Ink Co., Ltd.), and the like. For example, the inorganic colorant having a body color ranging from blue to green which can be employed in the radiation image storage panel of the present invention includes ultramarine blue, cobalt blue, cerulean blue. Other useful colorants are the blue colorants sold by BASF AG of Germany under the trade name HELIOGEN BLUE and those sold by Bayer AG of Germany under trade name MACROLEX BLUE.

The colorant, contained in the voids of a panel of the present invention, intended for reflecting the emitted light is preferably a white pigment. Very suitable white pigments are, e.g., $TiO_2$, ZnS, $Al_2O_3$, MgO, $BaSO_4$, etc. $TiO_2$ in anatase crystal form is a preferred white pigment for use in a panel of this invention.

The colorant(s) can be brought in the voids either before adding a polymeric compound, as described herein above, in the voids or together with the polymeric compound. When the colorant is brought into the voids before the polymeric compound, then the compound can be introduced into the fine gaps whose width is preferably 1–30 μm. The substance of fine particles having a diameter of several hundreds of nanometers may be introduced physically without previous processing. In case that the substance has lower melting point, it may be heated and introduced. The substance may be permeated into the gap when dissolved or dispersed in a liquid having suitable viscosity and is deposited by evaporation or modification by heating. The substance may also be introduced into the gap by a gas phase deposition method. In the latter case a suitable pigment can be a dye as used in thermal dye sublimation transfer. Typical and specific examples of dyes for use in thermal dye sublimation transfer have been described in e.g. EP-A-209 990, EP-A-209 991, EP-A-216 483, EP-A-218 397, EP-A-227 095, EP-A-227 096, EP-A-229 374, EP-A-235 939, EP-A-247 737, EP-A-257 577, EP-A-257 580, EP-A-258 856, EP-A-400 706, EP-A-279 330, EP-A-279 467, EP-A-285 665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, U.S. Pat. No. 5,026,677, JP-A-84/78 894, JP-A-84/78 895, JP-A-84/78 896, JP-A-84/227 490, JP-A-84/227 948, JP-A-85/27 594, JP-A-85/30 391, JP-A-85/229 787, JP-A-85/229 789, JP-A-85/229 790, JP-A-85/229 791, JP-A-85/229 792, JP-A-85/229 793, JP-A-85/229 795, JP-A-86/41 596, JP-A-86/268 493, JP-A-86/268 494, JP-A-86/268 495, and JP-A-86/284 489. When the colorants are not introduced by gas phase deposition in the voids between the phosphor needles, then colorants can, for application in the voids of a phosphor panel of this invention, be dissolved or dispersed in any suitable solvent. Hereinafter the term "solution(s) of a colorant" is used to include both solution and dispersions. Examples of suitable solvents are, e.g., lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents. When the phosphor screen comprises a vapor deposited CsBr:Eu needle phosphor it is preferred to use solvents that can easily be kept water free, wherein by "water free" is understood a solvent that has less than 10% wt/wt of water. Therefore esters of lower alcohols with lower aliphatic acids such as methyl acetate, ethyl acetate and butyl acetate and toluene are preferred solvents.

When the colorants are dispersed in the solution it is preferred that the average particle size of the colorant is adapted to the width of the voids. It is known, from e.g. U.S. Pat. No. 4,947,046, that the voids between phosphor needles are between 0.01 and 30 μm.

In a preferred embodiment of the present invention, the polymeric solution for filling the voids further contains one or more colorants so that in one step both the elasticity of the screen and the image quality have been increased by adding simultaneously a polymer and at least one colorant in the voids.

The invention further encompasses a method for producing a binderless phosphor screen comprising the steps of:

vapor depositing a photostimulable phosphor on a substrate forming a phosphor layer with phosphor needles and voids between them, applying a solution of a polymer on said vapor deposited phosphor, wiping the excess of said solution from said phosphor layer and drying the phosphor screen.

According to the said method of the present invention an additional step of applying at least one colorant in said voids is performed before said step of applying a solution of a polymer on said vapor deposited phosphor. In another embodiment according to the said method, in said step of applying a solution of a polymer on said vapor deposited phosphor, a solution of a polymer is used further comprising at least one colorant.

The invention also encompasses a method for producing a binderless phosphor screen on a substrate containing a CsX:Eu stimulable phosphor, wherein X represents a halide selected from the group consisting of Br, Cl and combinations thereof comprising the steps of:

bringing multiple heatable containers of CsX and a Europium compound selected from the group consisting of $EuX'_2$ $EuX'_3$ and EuOX', X' being selected from the group consisting of F, Cl, Br, I and combinations thereof together with the substrate in a deposition chamber that is evacuated to at least $10^{-1}$ mbar, depositing, by a method selected from the group consisting of physical vapor deposition, chemical vapor deposition or atomisation technique, both said CsX and said Europium compound on a substrate in such a ratio that on said substrate a CsX phosphor, doped with between $10^{-3}$ and 5 mol % of Europium, is formed applying a solution of a polymer on said vapor deposited phosphor, wiping the excess of said solution from said vapor deposited phosphor and drying the phosphor screen.

According to the said method of the present invention an additional step of applying at least one colorant in said voids is performed before said step of applying a solution of a polymer on said vapor deposited phosphor. In another embodiment according to the said method, in said step of applying a solution of a polymer on said vapor deposited phosphor, a solution of a polymer is used further comprising at least one colorant.

The invention further encompasses a method for producing a binderless phosphor screen on a substrate containing a CsX:Eu stimulable phosphor, comprising the steps of:

bringing a heatable container with a CsX:Eu phosphor, X being selected from the group consisting of Cl, Br and combinations thereof together with the substrate in a deposition chamber that is evacuated to at least $10^{-1}$ mbar, depositing, by a method selected from the group consisting of physical vapor deposition, chemical vapor deposition or atomisation technique, said CsX:Eu phosphor forming a vapor deposited phosphor layer with needle shaped phosphor, applying a solution of a polymer on said vapor deposited phosphor, wiping the excess of said solution from said vapor deposited phosphor and drying the phosphor screen.

According to the said method an additional step of applying at least one colorant in said voids is performed before said step of applying a solution of a polymer on said vapor deposited phosphor. In another embodiment according to the method of the present invention, in said step of applying a solution of a polymer on said vapor deposited phosphor, a solution of a polymer is used further comprising at least one colorant.

All methods mentioned above thus beneficially comprise an additional step of providing at least one colorant to the voids before the step of applying a solution of a polymer on said vapor deposited phosphor, wherein, in a specific embodiment said additional step is a step of vapor depositing a colorant in the voids of the phosphor panel. In this additional step, the colorant can be either a colorant absorbing the stimulating radiation or a colorant reflecting the light emitted by the stimulable phosphor upon stimulation or it can be both.

In the methods above it is possible to use in the step of applying a solution of a polymer on said vapor deposited phosphor, a solution of a polymer that further contains at least one colorant. In a preferred embodiment said solution contains at least two colorants, one absorbing the stimulating radiation and one reflecting the light emitted by the stimulable phosphor upon stimulation.

Furtheron in all methods according to the present invention, it is preferred that, said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

When the voids between the phosphor needles have been filled with a solution of a polymer (that is not intended to produce simultaneously a protective layer), then a protective layer may be applied to the panel. This layer can be any protective layer known in the art, it can be a radiation cured layer as disclosed in, e.g., U.S. Pat. No. 6,120,902, and in co-pending EP-Application No. 01000695, filed Dec. 3, 2001.

When desired or required the protective layer of the present invention may include spacing particles for further increase of the transportability and adjustment of the electrostatic properties.

Suitable spacing agents in the form of friction reducing polymer beads selected from the group consisting of solid polystyrene, solid polyalkylene and a solid organic fluorinated polymer. Preferably the spacing agents are beads incorporating fluorinated moieties. Such beads have been described in U.S. Pat. No. 4,059,768. In the construction of the scanning apparatus used for reading storage phosphor screens the trend is towards more and more compact apparatus, so that the distance between the (moving) storage phosphor screen and mechanical (moving) parts of the scanner can become very low and can become measured in 10 µm up to 100 µm. When then a storage phosphor screen with a protective layer according to the present invention has protruding beads it is important that the beads do not touch mechanical parts of the scanner and that this is true, even when the storage panel shows some wobble during transport in the scanner. Therefore beads used as spacing particles in a storage phosphor screen of the present invention preferably have a volume median diameter, dv50, so that 5 µm≦dv50≦25 µm and a numeric median diameter, dn50, so that 1≦dv50/dn50≦1.20. Further the beads are preferably adapted to the thickness, t, of the protective layer on the storage phosphor panel of the present invention so that and said polymeric beads have a volume median diameter, dv50, according to the relationship: 1.25≦dv50/t≦4.0.

The phosphor layer of a binderless storage phosphor screen according to the present invention can be prepared by vacuum deposition of the storage phosphor crystals on the substrate as well as by combining (mixing) the ingredients for the storage phosphor (phosphor precursors) and then evaporating this mixture in order to have the phosphor formed "in situ" during evaporation.

The storage phosphor in a binderless storage phosphor screen according to the present invention can be any storage phosphor known in the art. Preferably the storage phosphor in a binderless storage phosphor screen of this invention is an alkali metal phosphor Suitable phosphors are, e.g., phosphors according to formula I:

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and 0≦a≦1, 0≦b≦1 and 0<c≦0.2. Such phosphors have been disclosed in, e.g., U.S. Pat. No. 5,736,069.

Highly preferred storage phosphors for use in a binderless phosphor screen of the present invention are CsX:Eu stimulable phosphors, wherein X represents a halide selected from the group consisting of Br and Cl prepared by a method comprising the steps of mixing said CsX with between $10^{-3}$ and 5 mol % of a Europium compound selected from the group consisting of $EuX'_2$, $EuX'_3$ and $EuOX'$, X' being a member selected from the group consisting of F, Cl, Br and I;

firing said mixture at a temperature above 450° C.;

cooling said mixture and recovering the CsX:Eu phosphor.

A well known use of storage phosphors is in the production of X-ray images. In U.S. Pat. No. 3,859,527 a method for producing X-ray images with a photostimulable phosphor, which are incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which are processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using a phosphor screen thus also by a digital radiographic system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by physical vapour deposition, which may be thermal vapour deposition, sputtering, electron beam deposition or other of phosphor material on a substrate. However, this production method can not be used to produce high quality screens with every arbitrary phosphor available. The mentioned production method leads to the best results when phosphor crystals with high crystal symmetry and simple chemical composition are used.

The use of alkali metal halide phosphors in storage screens or panels is well known in the art of storage phosphor radiology and the high crystal symmetry of these phosphors makes it possible to provide structured screens and binderless screens.

It has been disclosed that when binderless screens with an alkali halide phosphors are produced it is beneficial to have the phosphor crystal deposited as some kind of piles, needles, tiles, etc. In, e.g., U.S. Pat. No. 4,769,549 it is disclosed that the image quality of a binderless phosphor screen can be improved when the phosphor layer has a block structure shaped in fine pillars. In e.g. U.S. Pat. No. 5,055,681 a storage phosphor screen comprising an alkali halide phosphor in a pile-like structure is disclosed. The image quality of such screens needs still to be increased and in JP-A-06/230 198 it is disclosed that the surface of the screen with pillar like phosphors is rough and that a levelling of that surface can increase the sharpness. In U.S. Pat. No. 5,874,744 the attention is drawn to the index of refractivity of the phosphor used to produce the storage phosphor screen with needle-like or pillar-like phosphor.

Although all screens disclosed in this prior art can yield x-ray images with good quality, the need for a better compromise between speed of the recording system (i.e. as low as possible patient dose) with an image with high sharpness and low noise is still there.

It is an object of the invention to provide a stimulable phosphor screen useful in an X-ray recording system with a very good compromise between speed of the recording system (i.e. as low as possible patient dose) with an image with high sharpness and low noise.

The above mentioned object is realised by providing a stimulable phosphor screen having the specific features defined herein.

Further advantages and embodiments of the present invention will become apparent from the following description and drawings.

It has now been found that it is possible to improve a binderless phosphor screen comprising an alkali halide phosphor by producing it in such a manner that the phosphor is present on the support as needle-like crystals having a specific crystal orientation. It has been found that, when a phosphor screen showing high [100] unit cell orientation in the plane of the screen was produced, that such a screen shows a better compromise between speed and sharpness. The phosphor screens showing high (100) unit cell orientation in the plane of said screen are characterised by an XRD-spectrum wherein the intensity of the (100) diffraction line is at least equal to the intensity of the (110) diffraction line, when said XRD-spectrum is measured by positioning an X-ray source and an X-ray diffraction intensity detector at equal but varying angles with respect to the normal to said screen. Preferably the intensity of the (100) diffraction line is at least 5 times higher than the intensity of the (110) diffraction line and most preferably the intensity of the (100) diffraction line is at least 10 times higher than the intensity of the (110) diffraction line.

To realise such a crystal orientation on the screen the binderless phosphor layer is applied to the support a by method selected from the group consisting of physical vapour deposition, thermal vapour deposition, chemical vapour deposition, electron beam deposition, radio frequency deposition and pulsed laser deposition. In fact any of the methods above for preparing the binderless phosphor screen is suitable as long as the parameters of the method can be adjusted so that the requirements of the crystallinity of the phosphor needles as described herein above are met. Preferably the binderless phosphor screen is prepared by vacuum deposition under an inert gas atmosphere. It was found that by adjusting the temperature of the substrate and the pressure of the inert gas during vacuum deposition, the crystal orientation of the needles could be adjusted to the desired level.

The inert gas that is used during vapour deposition is preferably Ar. The temperature of the gas stream that enters the vacuum deposition apparatus is kept between 0° C. and 100° C. Preferably the gas stream is kept at room temperature, i.e., between about 20° C. and about 30° C. The cool gas stream entering the vacuum deposition apparatus can cool both the vapour before it is deposited as well as the substrate. It is preferred to keep said substrate at a temperature, T, so that $50° C. \leq T \leq 300° C.$, preferably $90° C. \leq T \leq 200° C.$ The Ar-pressure is at most 10 Pa, preferably kept between 1 Pa and 3 Pa, both limits included. In a more preferred embodiment the Ar-pressure is kept between 0.20 and 2.00 Pa and the temperature is adjusted so that the product between temperature in degrees Celsius and Ar-pressure in Pa is between 20 and 350.

It was found that when a phosphor screen was prepared under the circumstances set out above not only the crystal orientation of the needles could be adjusted to the desired level, but also the macroscopic dimensions of the needles could be influenced: when a method described above was used, very thin needles were obtained. This was especially so when the rate of vapour deposition of the phosphor or phosphor precursors was above 1 mg/cm² min.

Figure 7:
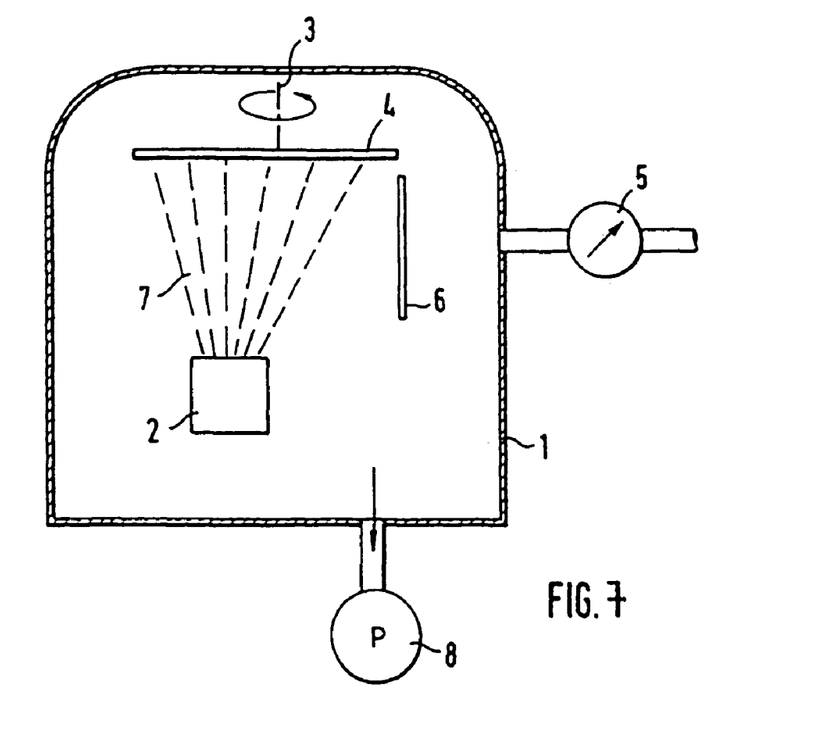
FIG. 7 shows a schematic view of a vapour deposition apparatus useful for producing a binderless storage phosphor screen.

FIG. 7 shows a schematic view of a vapour deposition apparatus useful for producing a binderless storage phosphor screen comprising an alkali metal storage phosphor said screen showing an XRD-spectrum with a (100) diffraction line having an intensity $I_{100}$ and a (110) diffraction line having an intensity $I^{110}$, so that $I^{100}/I^{110} \geq 1$, when said XRD-spectrum is measured according to TEST A. Such apparatus comprises a vacuum vessel (1) in which a vapour deposition source (2) is arranged opposite the substrate (4), which preferably rotates about an axis (3). An inert gas, such as argon, which is very much cooler than the vapour temperature of, typically, 650 to 700° C., for example being at room temperature, can be introduced into the vacuum vessel (1) via a regulating valve (5); the inert gas preferably firstly impinges on a baffle plate (6) and is not introduced directly into the vapour jet (7). The inert gas is evacuated up again via a vacuum pump (8), the vacuum pump is set such that a pressure of less than 10 Pa, preferably between 1 Pa and 3 Pa, is produced within the vacuum vessel (1). If so desired, when the cool gas stream is not sufficient for cooling of the substrate, it is possible to couple the substrate (4) to an external cooling device (not shown).

A binderless phosphor screen according to this invention can be prepared by vacuum deposition of the phosphor crystals on the substrate as well as by combining (mixing) the ingredients for the phosphor (phosphor precursors) and then evaporating this mixture so as to have the phosphor formed in situ during evaporation.

The phosphor in a binderless phosphor screen according to this invention can be any alkali metal phosphor known in the art. Suitable phosphors are, e.g., phosphors according to formula I:

$$M^{1+}X \cdot aM^{2+}X'_2 BM^{3+}X''_3 :cZ$$

wherein:
$M^{1+}$ is at least one member selected from the group consisting of Li, Na, K, Cs and Rb,
$M^{2+}$ is at least one member selected from the group consisting of Be, Mg, Ca, Sr, Ba, Zn, Cd, Cu, Pb and Ni,
$M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga,
Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0.1 \leq a \leq 1$, $0.1 \leq b \leq 1$ and $0 \leq c \leq 0.2$. Such phosphors have been disclosed in, e.g., U.S. Pat. No. 5,736,069.

Highly preferred phosphors for use in a binderless phosphor screen of this invention are CsX:Eu stimulable phosphors, wherein X represents a halide selected from the group consisting of Br and Cl prepared by a method comprising the steps of:
   mixing said CsX with between $10^{-3}$ and 5 mol % of an Europium compound selected from the group consisting of $EUX'_2$, $EuX'_3$ and EuOX', X' being a member selected from the group consisting of F, Cl, Br and I,
   firing said mixture at a temperature above 450° C. cooling said mixture and
   recovering the CsX:Eu phosphor.

Most preferably a CsBr:Eu stimulable phosphor, is used prepared by a method comprising the steps of:

mixing said CsX with between $10^{-3}$ and 5 mol % of an Europium compound selected from the group consisting of $EuX'_2$, $EuX'_3$ and EuOX', X' being a member selected from the group consisting of F, Cl, Br and I,
   firing said mixture at a temperature above 450° C.
   cooling said mixture and
   recovering the CsX:Eu phosphor.

The binderless screen can be prepared by bringing the finished phosphor on the support by any method selected from the group consisting of physical vapour deposition, sputtering, thermal vapour deposition, chemical vapour deposition, electron beam deposition, radio frequency deposition and pulsed laser deposition. It is also possible to bring the alkali metal halide and the dopant together and depositing them both on the support in such a way that the alkali metal phosphor is doped during the manufacture of the screen. Thus the invention encompasses a method for manufacturing a phosphor screen containing a CsX:Eu stimulable phosphor, wherein X represents a halide selected from the group consisting of Br and Cl comprising the steps of:
   bringing multiple containers of said CsX and an Europium compound selected from the group consisting of $EuX'_2$, $EuX'_3$ and EuOX', X' being a halide selected from the group consisting of F, Cl, Br and I in condition for vapour deposition and
   depositing, by a method selected from the group consisting of, thermal vapour deposition, chemical vapour deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition can proceed from a single container containing a mixture of the starting compounds in the desired proportions. Thus the method encompasses further a method for manufacturing a phosphor screen containing a CsX:Eu stimulable phosphor, wherein X represents a halide selected from the group consisting of Br and Cl comprising the steps of:
   mixing said CsX with between $10^{-3}$ and 5 mol % of an Europium compound selected from the group consisting of $EuX'^2$, $EuX'^3$ and EuOX', X' being a halide selected from the group consisting of F, Cl, Br and I
   bringing said mixture in condition for vapour deposition and
   depositing said mixture on a substrate by a method selected from the group consisting of physical vapour deposition, thermal vapour deposition, chemical vapour deposition, electron beam deposition, radio frequency deposition and pulsed laser deposition.

Support materials useful for binderless storage screens having a phosphor layer with a crystal orientation as per this invention include cardboard, glass, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminium foil and aluminium alloy foil; ordinary papers; baryta paper; resin-coated papers; pigment papers containing titanium dioxide or the like; and papers sized with polyvinyl alcohol or the like. A glass or Al-sheet or a thermostable plastic film is preferably employed as the support material.

When a glass support is used the support may comprise a coated layer with a light absorbing compound. This layer can be present on the back side (side where no phosphor is present) or may be present underneath the phosphor. The supports can also comprise subbing layers for having a better adhesion between the phosphor and the support.

The support, when it is a thermostable plastic film may contain a light-absorbing material such as carbon black, or may contain a light-reflecting material such as titanium dioxide or barium sulphate. The former is appropriate for preparing a high-resolution type storage screen, while the latter is appropriate for preparing a high-sensitivity type storage screen.

These supports may have a thickness which may differ depending on the material of the support, and may generally be between 60 μm and 10,000 μm, more preferably between 80 μm and 5,000 μm from the standpoint of handling.

EXAMPLES

Preparation of the Phosphor

Figure 1:
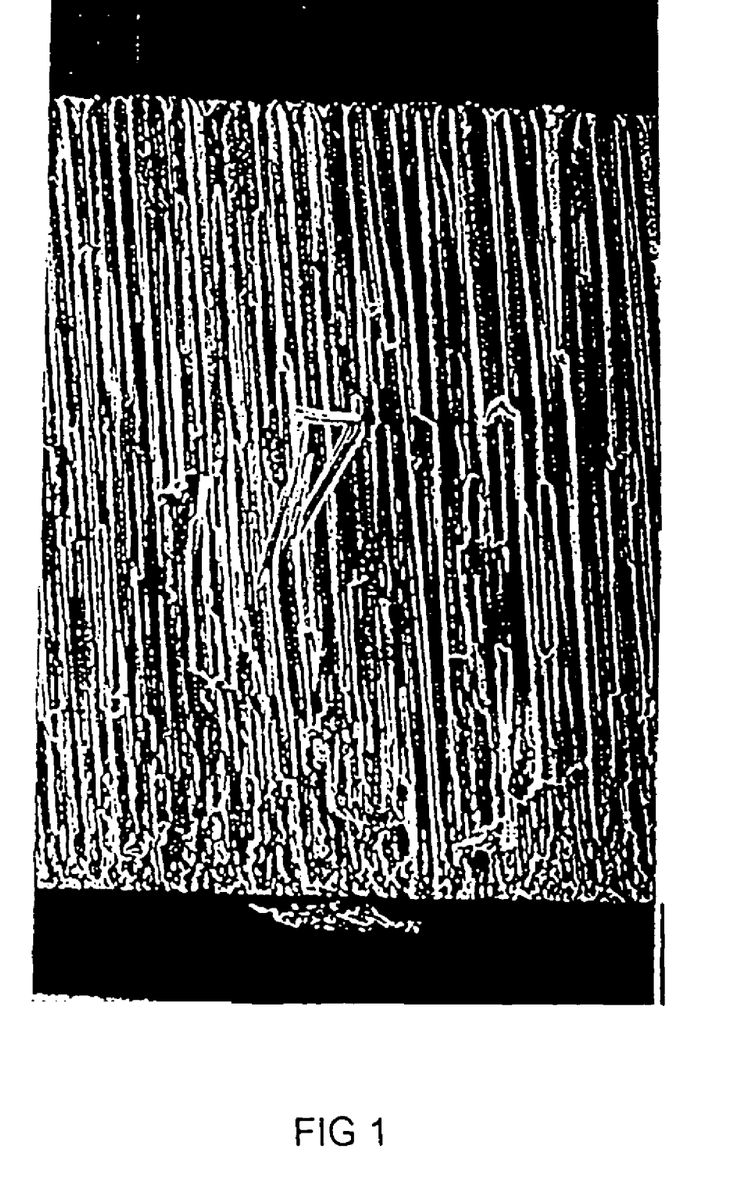
FIG. 1 shows a SEM photograph of a phosphor screen with needle-shaped phosphor.

CsBr:Eu screens were made via thermal vapour deposition of CsBr and EuOBr. To this aim, CsBr was mixed with EuOBr and placed in a container in a vacuum deposition chamber. The phosphor was deposited on a glass disk with a thickness of 1.5 mm and a diameter of 40 mm. The distance between the container and the substrate was 10 cm. During evaporation, the substrate was rotated at 12 rpm. The container with starting materials was heated to a temperature of 750° C. Before the start of the evaporation, the chamber was evacuated to a pressure of $4.10^{-5}$ mbar. During the evaporation process, Ar was introduced in the chamber. Variables in the deposition process were the substrate temperature and the Ar gas pressure. The different screens were produced under the conditions listed in Table 1. The Eu-concentration in the evaporated screens was measured with X-ray fluorescence and was of the order of 800 ppm. Via Scanning Electron Microscopy (SEM), the morphology of the deposited phosphor layer was determined. All phosphor layers were made up of needle shaped crystals. FIG. 1 shows a SEM view of an example phosphor layer taken perpendicular on an edge of the phosphor layer. It is clear that a needle like structure is present.

TABLE 1: Substrate Temperature and Ar Gas Pressure at the Different Screen Depositions

TABLE 1

Substrate temperature and Ar gas pressure at the different screen depositions

| Screen | Substrate temperature (° C.) | Ar pressure (Pa) |
|---|---|---|
| Comparative example 1 | 130 | 3.2 |
| Invention Example 1 | 150 | 2.2 |
| Invention Example 2 | 150 | 1.1 |
| Invention Example 3 | 300 | 0 |
| Invention Example 4 | 92 | 2.4 |

Measurement of Crystal Orientation TEST A

Figure 2:
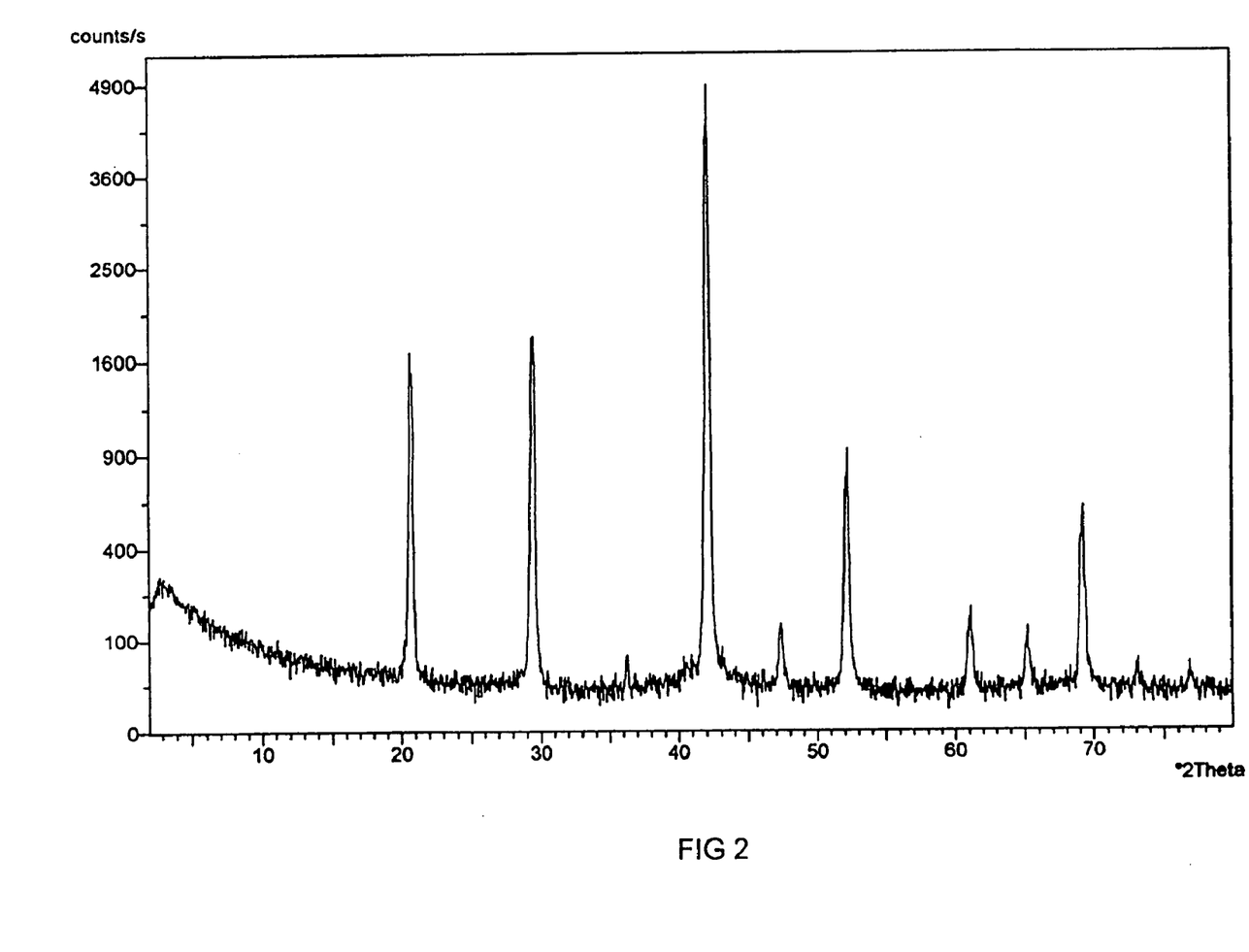
FIG. 2 shows an XRD-spectrum of a screen with a comparative needle-shaped phosphor.
Figure 3:
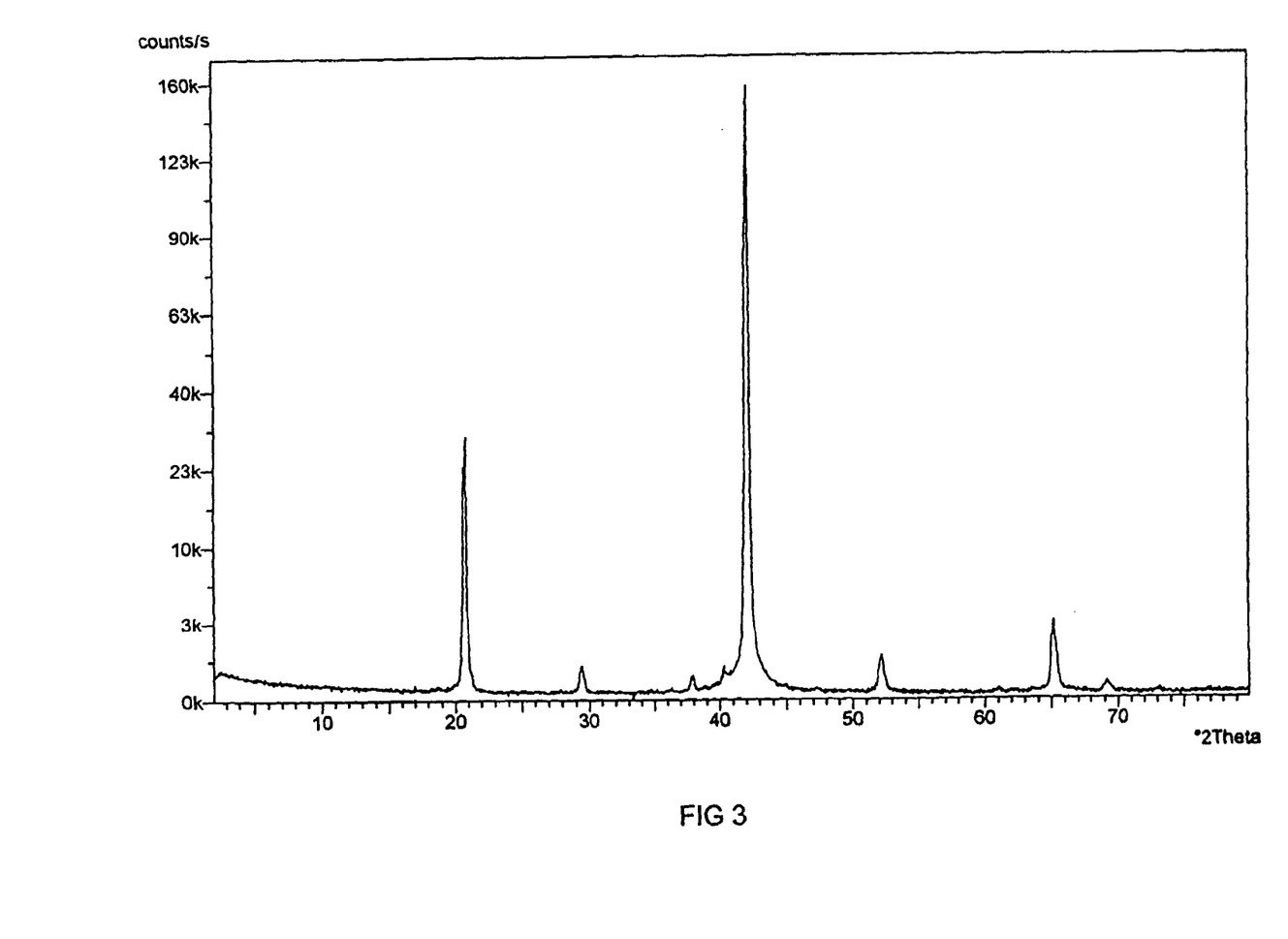
FIGS. 3–6 show XRD spectra of screens with invention needle-shaped phosphors.
Figure 4:
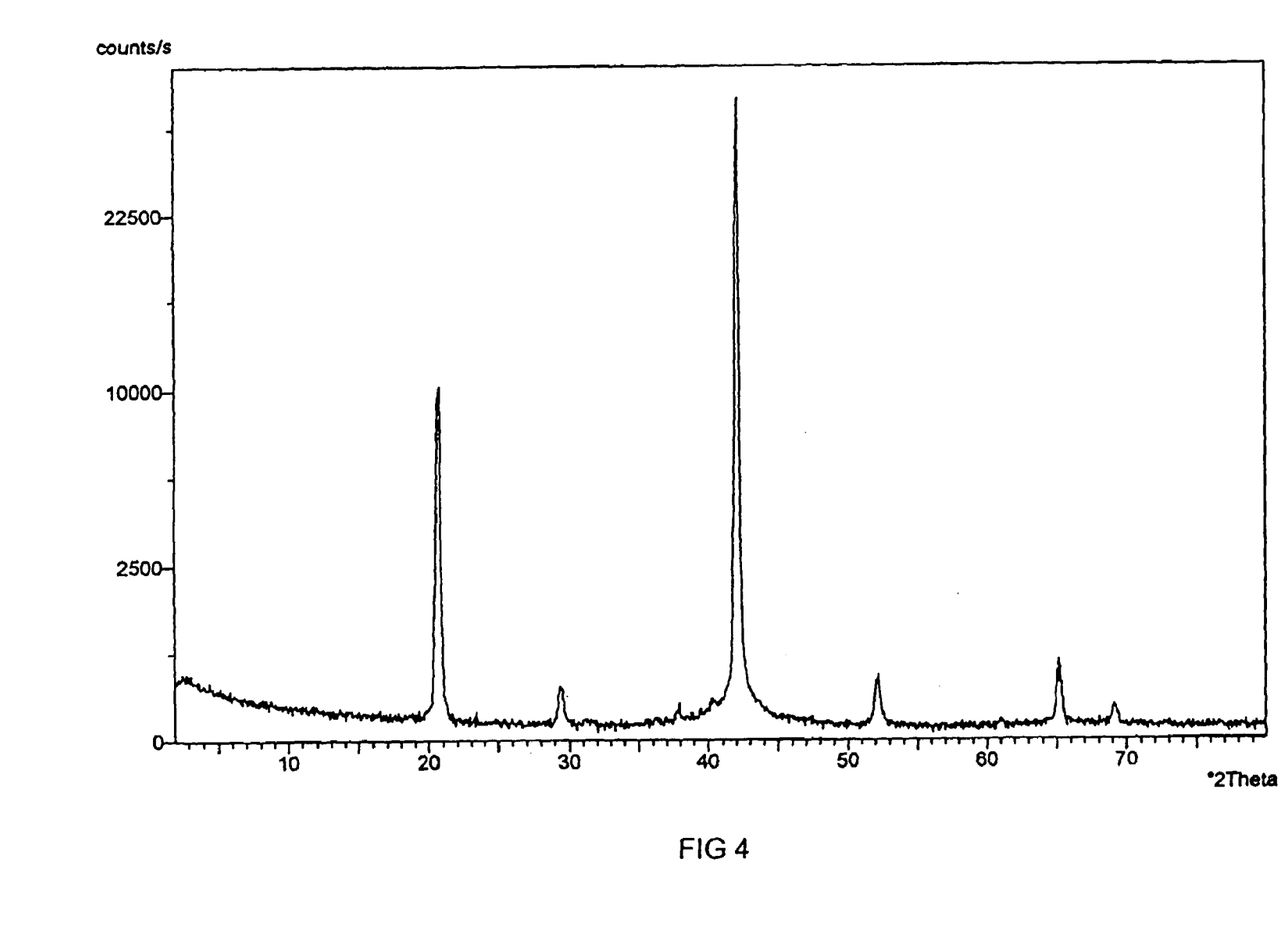
Figure 5:
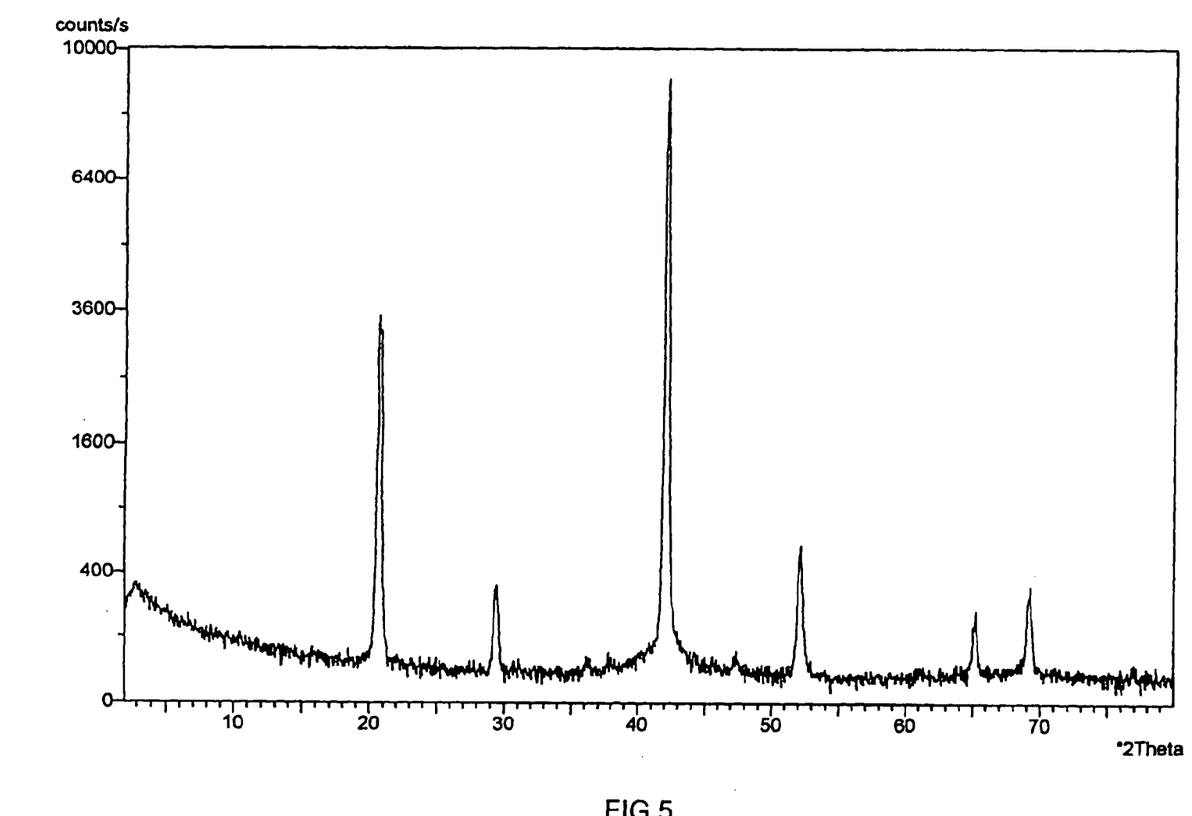
Figure 6:
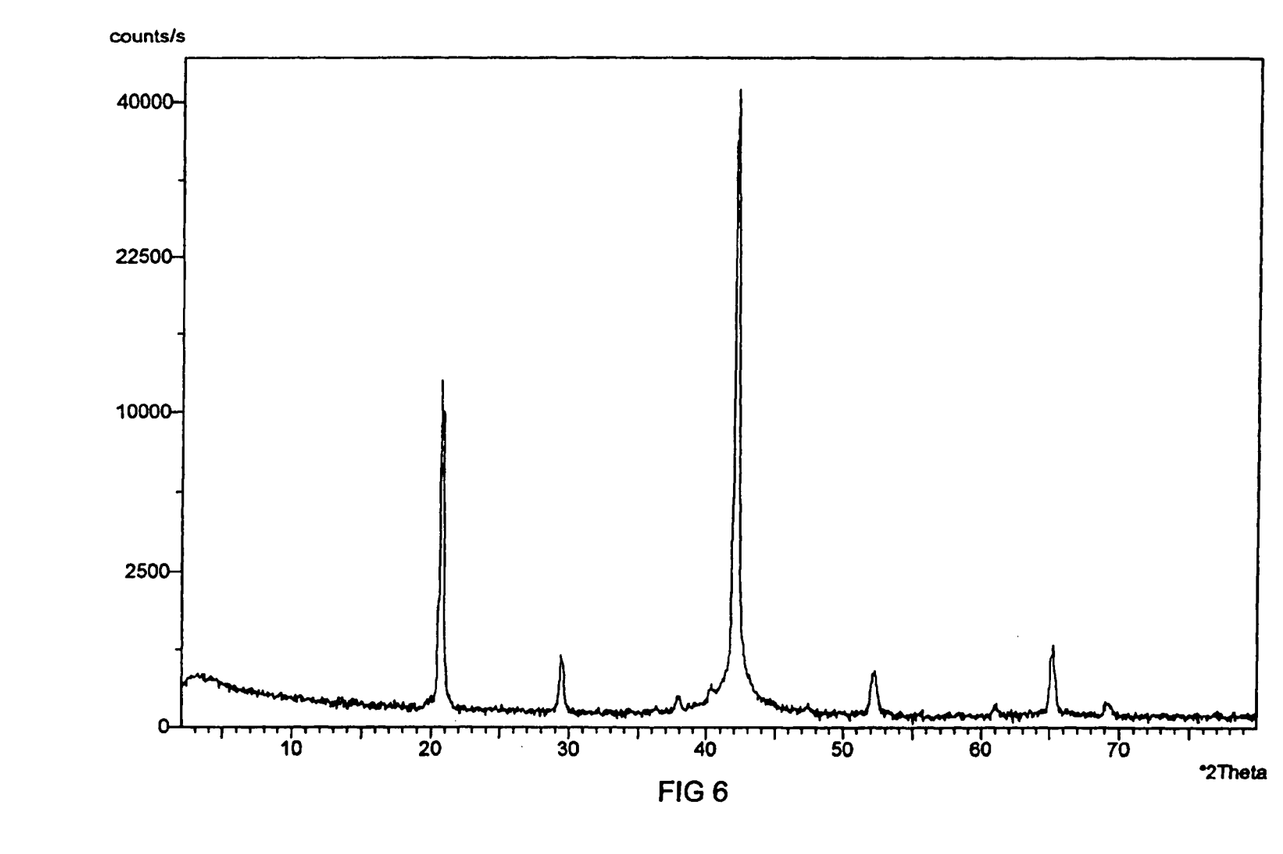

The orientation of the crystal unit cell in the deposited needle shaped crystal has been determined through measurement of the XRD spectrum. XRD spectra have been measured with the commercially available diffractometer. The diffractometer was a Philips X'pert with a MPPS (Multiple Purpose Sampling Stage) and a Cu tube emitting a Kα-line of 0.154056 nm. The spectra were taken and analysed with the commercial software coming with the diffractometer. The settings and measurement parameters of the measurement were as follows (TEST A):

Settings
40 kV en 50 mA
Incident beam: Divergence slit: fixed 1/8°
Incident beam: Anti scatter slit: fixed 1/40°
Incident beam: Fixed beam mask: 10 mm Measurement Parameters
Start 2θ: 2.00°
End 2θ: 80.00°
Step size: 0.05°
Time per step: 0.60 s
Secondary beam path: lower
Scan axis: 2θ
Scan mode: continuous
Total time: 15 mm 36 s
Gonio angle: 2.0°
Spinning: no FIG. 2 shows the XRD spectrum of comparative example 1. A fairly strong [100] diffraction line is shown at 2θ of about 21° and an evenly strong [110] diffraction line is shown at 2θ of about 29°, also a strong [200] diffraction line is shown at 2θ of about 42°.

FIGS. 3 to 6 show the XRD-spectra of respectively invention example 1, 2, 3 and 4. In these spectra the [110] diffraction line at 2θ of about 29° is barely visible, while the [100] diffraction line at 2θ of about 21° and the [200] diffraction line at 2θ of about 42° remain very strong.

For each of the screens, the ratio between the intensity of the [100] peak in the XRD-spectrum and the [110] peak was calculated. The results are given in table 2

Table 2

TABLE 2

| Screen | Ratio [100]/[110] |
|---|---|
| Comparative example 1 | 0.79 |
| Invention Example 1 | 54.71 |
| Invention Example 2 | 52.65 |
| Invention Example 3 | 12.16 |
| Invention Example 4 | 14.05 |

Sensitivity and Sharpness Measurements

In a first measurement the sensitivity (speed) of the phosphor screens, prepared under the conditions given in Table 1 was measured.

The screens were homogeneously irradiated with a dose of ca. 50 mR at 80 kVp. Read out was done in a flying spot scanner. In the scanner, the scanning light source was a 30 mW diode laser emitting at 690 nm. A 4-mm BG-39 (trade name of Hoya) filter was used to separate the stimulation light from the screen emission light. The scan-average levels (SAL's) were determined as the average signal produced by the screens in the photomultiplier tube.

In a second measurement, the sharpness of the images, produced by the screens was measured. As a measure for the sharpness, the square wave response at 2 lp/mm was determined.

A grid with line pairs at spatial frequencies of 0.025 to 3 lp/mm was placed on top of the cassette, containing the screens. The grid was imaged at 80 kvp and 5 mA during 30″. The screens were scanned with the flying spot scanner described above. The signal modulation was determined at 0.025 lp/mm and at 2 lp/mm. The SWR at 2 lp/mm was calculated as the ratio of the signal modulation at 2 lp/mm to the signal modulation at 0.025 lp/mm. The results of the measurements are listed in Table 3. Wherein the speed of the comparative example screen is arbitrary set to 100.

Table 3

TABLE 3

| Screen | Speed (arbitrary units) | SWR at 2 Screen lp/mm |
| --- | --- | --- |
| Comparative example 1 | 100 | 0.50 |
| Invention Example 1 | 186 | 0.56 |
| Invention Example 2 | 214 | 0.59 |
| Invention Example 3 | 102 | 0.66 |
| Invention Example 4 | 156 | 0.53 |

It can be concluded that the comparative example 1 screen with less developed (100) unit cell orientation, has inferior quality with respect to the invention examples 1–4 with almost perfect (100) unit cell orientation. It is possible to adjust the orientation of the crystal to choose a desired speed/sharpness compromise by using the temperature of the substrate during the vacuum deposition and the pressure of the inert gas as parameters.

What is claimed is:

1. A binderless stimulable phosphor screen having a support and a vapor deposited phosphor layer with phosphor needles and voids between said needles, characterized in that said voids between said needles are partially filled with a polymeric compound wherein, said voids are filled over a length of at least 5 μm.

2. A binderless stimulable phosphor screen according to claim 1, wherein, said voids are filled over a length of at least 10 μm.

3. A binderless stimulable phosphor screen according to claim 2, wherein said polymeric compound is selected from the group consisting of vinyl resins comprising moieties derived from esters of acrylic acid and vinyl resins comprising moieties derived from esters of methacrylic acid.

4. A binderless stimulable phosphor screen according to claim 2, wherein said polymeric compound is a thermoplastic rubber.

5. A binderless stimulable phosphor screen according to claim 1, wherein said polymeric compound is selected from the group consisting of vinyl resins comprising moieties derived from esters of acrylic acid and vinyl resins comprising moieties derived from esters of methacrylic acid.

6. A binderless stimulable phosphor screen according to claim 1, wherein said polymeric compound is a thermoplastic rubber.

7. A method for producing a binderless phosphor screen comprising the steps of:
vapor depositing a photostimulable phosphor on a substrate forming a phosphor layer with phosphor needles and voids between them,
applying a solution of a polymer on said vapor deposited phosphor,
filling said voids over a length of at least 5 μm,
wiping the excess of said solution from said phosphor layer afterwhich said voids are partially filled, and
drying the phosphor screen.

8. Method according to claim 7, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

9. Method according to claim 7, wherein an additional step of applying at least one colorant in said voids is performed before said step of applying a solution of a polymer on said vapor deposited phosphor.

10. Method according to claims 7, wherein, in said step of applying a solution of a polymer on said vapor deposited phosphor, a solution of a polymer further comprising at least one colorant is used.

11. Method according to claim 10, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

12. A method for producing a binderless phosphor screen on a substrate containing a CsX:Eu stimulable phosphor, comprising the steps of:
bringing a heatable container with a CsX:Eu phosphor, X being selected from the group consisting of Cl, Br and combinations thereof together with the substrate in a deposition chamber that is evacuated to at least $10^{-1}$ mbar,
depositing, by a method selected from the group consisting of physical vapor deposition, chemical vapor deposition or atomisation technique, said CsX:Eu phosphor forming a vapor deposited phosphor layer with needle shaped phosphor with voids between said needle shaped phosphor,
applying a solution of a polymer on said vapor deposited phosphor,
filling said voids over a length of at least 5 μm,
wiping the excess of said solution from said vapor deposited phosphor afterwhich said voids are partially filled and
drying the phosphor screen.

13. Method according to claim 12, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

14. Method according to claim 12, wherein an additional step of applying at least one colorant in said voids is performed before said step of applying a solution of a polymer on said vapor deposited phosphor.

15. Method according to claims 12, wherein, in said step of applying a solution of a polymer on said vapor deposited phosphor, a solution of a polymer further comprising at least one colorant is used.

16. Method according to claim 15, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

17. A method for producing a binderless phosphor screen on a substrate containing a CsX:Eu stimulable phosphor, wherein X represents a halide selected from the group consisting of Cl, Br and combinations thereof, said method comprising the steps of:
bringing multiple heatable containers of CsX and a europium compound selected from the group consisting of $EuX'_2$, $EuX'_3$ and $EuOX'$, X' being selected from the group consisting of F, Cl, Br, I and combinations thereof together with the substrate in a deposition chamber that is evacuated to at least $10^{-1}$ mbar, depositing, by a method selected from the group consisting of physical vapor deposition, chemical vapor deposition or atomisation technique, both said CsX and said europium compound on a substrate in such a ratio that on said substrate a CsX phosphor, doped with between $10^{-3}$ and 5 mol % europium is formed comprising phosphor particles with voids between said phosphor particles, applying a solution of a polymer on said vapor deposited phosphor, filling said voids over a length of at least 5 μm, wiping the excess of said solution from said vapor deposited phosphor afterwhich said voids are partially filled and drying the phosphor screen.

18. Method according to claim 17, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

19. Method according to claim 17, wherein an additional step of applying at least one colorant in said voids is performed before said step of applying a solution of a polymer on said vapor deposited phosphor.

20. Method according to claims 17, wherein, in said step of applying a solution of a polymer on said vapor deposited phosphor, a solution of a polymer further comprising at least one colorant is used.

21. Method according to claim 20, wherein said solution of a polymer is selected from the group consisting of a solution of vinyl resins comprising moieties derived from esters of acrylic acid in ethylacetate, a solution of vinyl resins comprising moieties derived from esters of methacrylic acid in ethylacetate and a solution of a thermoplastic rubber in a mixture of ethylacetate and toluene.

* * * * *